United States Patent
Bennett et al.

(10) Patent No.: US 6,685,758 B1
(45) Date of Patent: Feb. 3, 2004

(54) MATERIAL DISPOSAL SYSTEM

(75) Inventors: Thomas F. Bennett, Medford, MA (US); Thomas P. LeClair, Boston, MA (US)

(73) Assignee: Sprague Air Controls, Inc., Hingham, MA (US)

( * ) Notice: Subject to any disclaimer, the term of this patent is extended or adjusted under 35 U.S.C. 154(b) by 223 days.

(21) Appl. No.: 10/004,086

(22) Filed: Oct. 23, 2001

(Under 37 CFR 1.47)

(51) Int. Cl.⁷ .............................. B65B 1/04; B65B 31/04
(52) U.S. Cl. ................ 55/385.1; 55/385.4; 55/493; 55/502; 96/135; 96/136; 96/149; 141/65; 141/231; 141/329; 141/333; 222/5; 222/83.5
(58) Field of Search ................ 55/385.1, 385.4, 55/493, 502; 96/135, 136, 149; 141/65, 231, 329, 333; 222/5, 83.5

(56) References Cited

U.S. PATENT DOCUMENTS

| | | | |
|---|---|---|---|
| 4,767,427 A | * 8/1988 | Barabas et al. | ............... 55/493 |
| 4,775,469 A | * 10/1988 | Zimmerly | .................. 55/493 |
| 4,818,398 A | * 4/1989 | Lott et al. | .................... 55/493 |
| 5,033,520 A | 7/1991 | Kuehmichel | |
| 5,052,451 A | 10/1991 | Gentilcore et al. | |
| 5,549,723 A | * 8/1996 | Terry | ............................ 55/493 |
| 5,992,475 A | 11/1999 | Campbell | |
| 6,306,191 B1 | * 10/2001 | McInerney et al. | ........ 55/385.4 |
| 6,422,273 B1 | 7/2002 | Campbell | |

* cited by examiner

Primary Examiner—Minh-Chau T. Pham
(74) Attorney, Agent, or Firm—Perkins Smith & Cohen, LLP; Jerry Cohen; Peter J. Borghetti

(57) ABSTRACT

A material disposal system ideally suited for use in container filling operations and includes a cover member and a hopper having a lower door operable relative to the hopper by pneumatic or other actuating means for opening and closing the passage disposed above a drum or other container to be filled. The cover member and hopper are fixedly attached to each other. The cover member forms a seal around the inside of the container opening such that air and other gases escaping from the container by the filling or other material handling operation are directed through filter means which separate airborne particulates therefrom. The material disposal system is adaptable for covering and sealing a wide variety of containers. The filter means is adaptable for filtering a wide variety of materials and particulate sizes for removal of noxious gases, vapors and other airborne effluents.

17 Claims, 4 Drawing Sheets

MATERIAL DISPOSAL SYSTEM

BACKGROUND OF THE INVENTION

The present invention relates generally to material disposal systems and more particularly to a device and system for effectively and economically controlling odor and other airborne materials that result from material handling operations involving noxious solid waste.

The handling of solid waste poses a special problem, due to the potential exposure to those loading the waste into disposal containers. Currently, 55-gallon disposal drums have a flat steel cover. Any time something is disposed of, the cover must be lifted and the contents, including fumes and odors, are exposed to the work environment. While protective gear may be worn, it is preferable to prevent any release to avoid contaminating not only the worker but the waste generating or waste disposal facility.

Numerous devices for controlling odor during container filling and other material handling operations involving pulverulent solids including a variety of means for sealing a container to be filled and for filtering airborne particulates from the flow of air created by the handling operation are well known in the art, but all are relatively complicated devices.

It is therefore a principal object of the present invention to provide a material disposal system which filters airborne particulates from air and other gases escaping from a material handling operation.

Another object is to provide a material disposal system having odor purging means.

Another object is to provide a material disposal system which is relatively simple and inexpensive to manufacture, install and operate and which is adaptable for use with a wide variety of material handling operations and with containers of different sizes and shapes.

These and other objects and advantages of the present invention will become apparent to those skilled in the art after considering the following detailed specification in conjunction with the accompanying drawings wherein.

SUMMARY OF THE INVENTION

The objects set forth above as well as further and other objects and advantages of the present invention are achieved by the embodiments of the invention described hereinbelow.

The present material disposal system is ideally suited for use in container filling operations and includes a cover member and a hopper having a lower door operable relative to the hopper by pneumatic or other actuating means for opening and closing the passage disposed above a drum or other container to be filled. The cover member and hopper are fixedly attached to each other. The cover member forms a seal around the inside of the container opening such that air and other gases escaping from the container by the filling or other material handling operation are directed through filter means which separate airborne particulates therefrom. The present device is adaptable for covering and sealing a wide variety of containers. The present filter means is adaptable for filtering a wide variety of materials and particulate sizes for removal of toxic gases, vapors and other airborne effluents.

In a typical container filling operation, a drum or other container to be filled is located beneath the drum cover. The invention operates to cover the open top of a drum or other container during solids handling operations and which acts to seal the opening of the container and filter particulate matter from the air which is displaced and escapes from the container and associated material handling devices during the handling operation. The present material disposal system is well suited for use in industrial plants, warehouses and packaging facilities wherein it is desired to control nuisance and greater levels of odors without the requirement of complex air movement means such as ducts and blowers and the like. The present material disposal system is especially well suited for use in solids loading. The present material disposal system may be operated using pneumatic power or other means and may be automatically controlled by a plurality of valves. The present material disposal system includes odor purging means for use as required with toxic substances and also an inlet port usable for purging the system with inert gas and for other purposes.

The present device may be controlled using a variety of different systems. The preferred embodiment has two systems: a hopper door control system and a hopper purge control system. The hopper door control system is controlled by a five-position/two-way valve that control the introduction of compressed air to a plurality of other valves, which actuate, for example, pneumatic cylinders pivotally connected to the hopper bottom door. When the two-way valve is placed in the down or doors open position, air is immediately and simultaneously supplied to the top side of each air cylinder. When the material in the hopper has been dumped into the drum, the two-way valve is reversed to the up or close door position raising of the bottom door.

The second function of the pneumatic control system is to upply air to the vacuum pump to evacuate the hopper. A three-position/two-way valve, conventionally attached to the base on the hopper, is activated when the hopper doors return to their closed position. The three-position/two-way valve opens the air flow path from the air supply to the vacuum pump. After a desired period of delay as determined by the air flow through delay/timer valve, a second valve opens to flow air through the vacuum pump. The air in the hopper is drawn out and through the filter, for example a 3 microns charcoal filter element, for purification before being released into the environment. After a predetermined time period, delay/timer valve closes and the process is ready to begin again. The pneumatic system is driven by at least a 50 PSI air supply, thereby eliminating the need for electricity.

The invention is designed to fit securely on top of a waste disposal drum, for example a 55-gallon steel drum or other equivalent containers. The preferred invention is a pneumatically operated hopper system that allows for the disposal of noxious waste into the drum without re-introducing odors to the work environment.

Alternative embodiments can be electrically or hydraulically actuated hopper systems.

Alternative embodiments may serve as a secure device for disposal with lock out capabilities.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Figure 1:
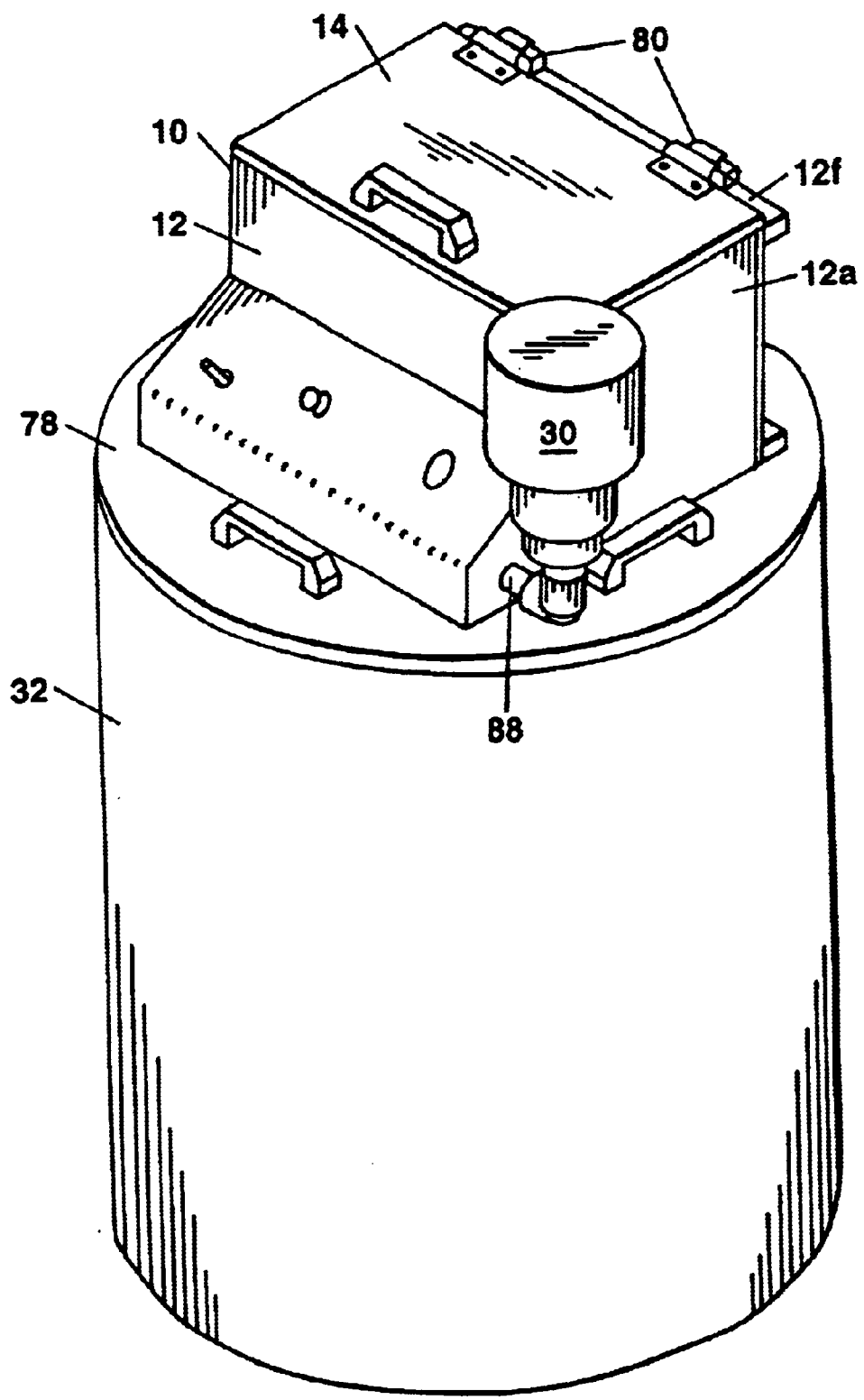
FIG. 1 is a pictorial view of the preferred embodiment of the present invention.

Referring now to the preferred embodiment of the above invention illustrated in the accompanying drawings, there is illustrated in FIG. 1 a pictorial view of the material disposal system constructed in accordance with the invention, same being generally indicated by numerical designation 10, adapted to be removably attached to a container 32, such as a disposal drum, by a conventional retaining ring (not shown). The disposal drum 32 is shown as a conventionally shaped drum having an opening (not shown) at the top thereof.

Figure 2A:
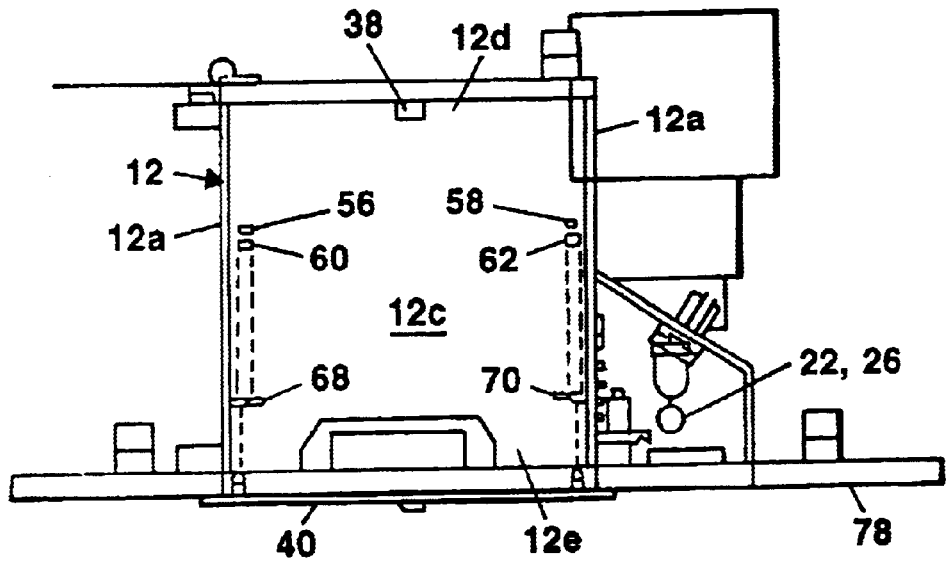
FIG. 2a is a side view of the FIG. 1 embodiment.
Figure 2B:
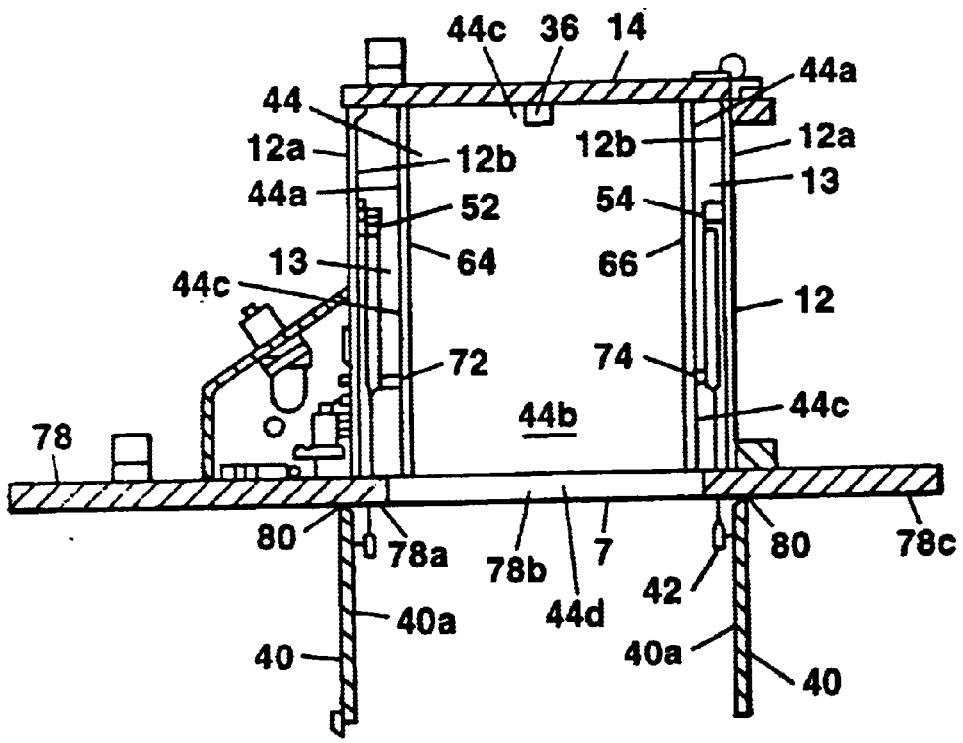
FIG. 2b is a section view of cut IIb—IIb of the FIG. 1a embodiment of the present invention.

As illustrated in FIGS. 1, 2a and 2b, the structure of the device 10 includes a case 12, a hopper 44, a lid 14, bottom doors 40, and a drum cover 78. The case 12 includes sidewalls 12a that form a cavity 12c with a top opening 12d and a bottom opening 12e. The hopper 44 includes sidewalls 44a that form a chamber 44b with a top feed hole 44c and a bottom drop hole 44d. The hopper 44 is disposed within the cavity 12c of the case 12 forming a gap 13 between the inner surface 12b of the case 12 and the outer surface 44c of the hopper 44. The pneumatic cylinders (to be discussed later) are disposed in the gap 13 to be protected from the waste material and the contaminated environment of the hopper 44. The lid 14 is attached by conventional means, for example hinges 80, to the upper edge 12f of the case 12. The lid 14 forms a sufficient seal with the sidewalls 12a of the case 12 and/or the sidewalls 44a of the hopper 44 such that when in the closed position during operation there is little or no outside air leakage into the hopper 44. The bottom doors 40 are attached by conventional means, for example hinges 80, to the lower surface 78a of the drum cover 78 and form a sufficient seal when in the closed position during operation such that there is little or no outside air leakage from the disposal drum 32 into the hopper 44. Though the bottom doors are shown as two doors, it is within the scope of the invention that the functionality of the doors can be achieved with as few as one door or more than two. With the cavity 12c of the case 12 and/or the chamber 44b of the hopper 44 adequately sealed, a sufficient vacuum can be created in the hopper 44 to purge the contaminated air from the hopper 14.

The case 12 may be permanently or detachably mounted on the drum cover 78 using conventional means so as to be supported thereby. The case 12 is made preferably of polypropylene, but any material suitable, such as Teflon or metals including stainless steel, for the operating conditions and environment is acceptable. The lid 14 and lower doors 40 are also made of lightweight and high strength materials.

Figure 1A:
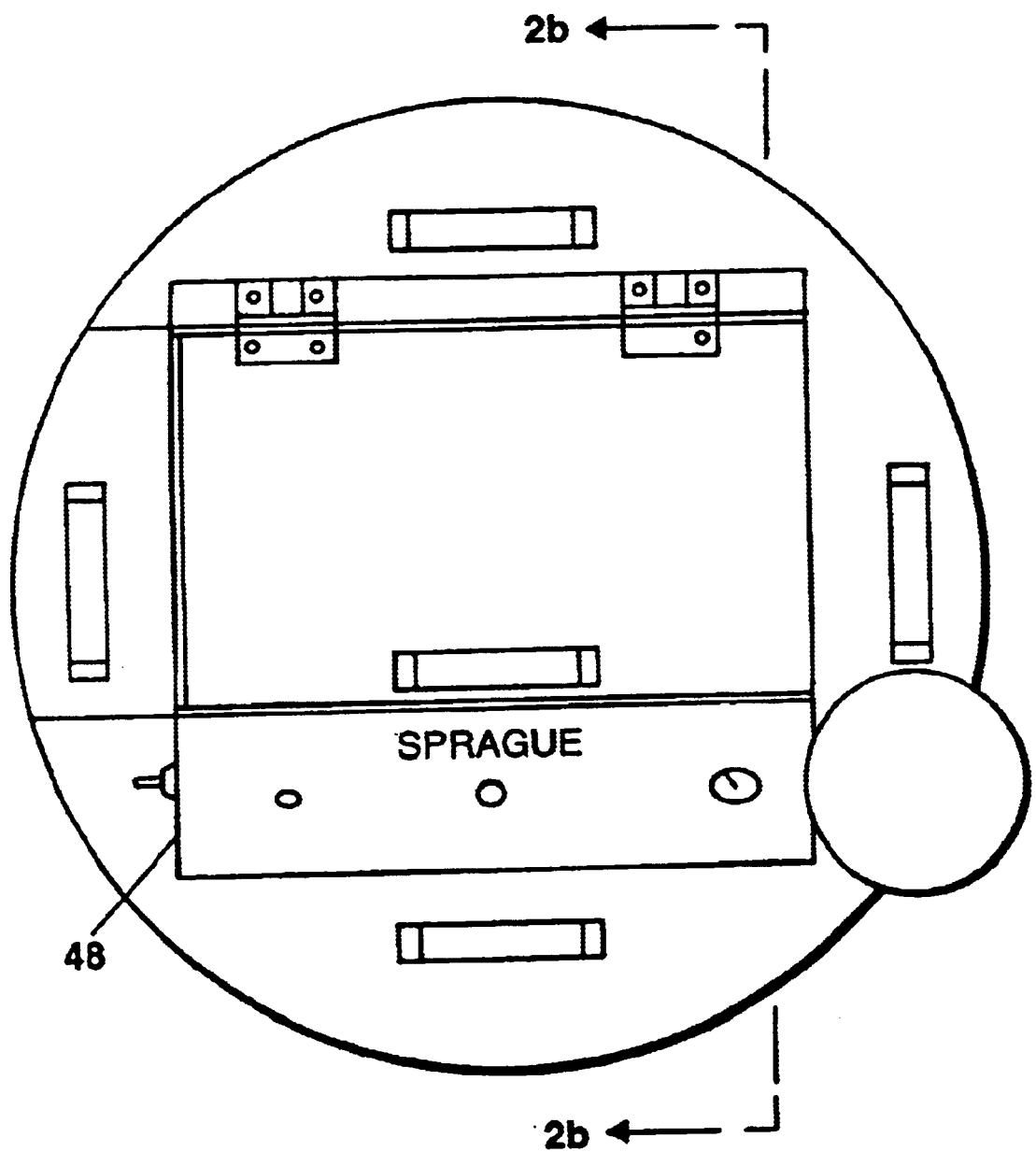
FIG. 1a is a top view of the present of the FIG. 1 embodiment of the present invention.

The lower doors 40 are controlled by a plurality of pneumatic cylinders 52, 54, 56, 58 pivotally attached to the inner wall 12b of the case 12 and the top surface 40a of the lower doors 40, and is axially operable upwardly and downwardly relative thereto. FIG. 2b, a section view of cut IIb—IIb of the FIG. 1a embodiment of the present invention, illustrates the pneumatic cylinders 52, 54, 56, 58 fully retracted and fully extended, respectively. The hopper 44 forms a protective barrier insolating the pneumatic cylinders 52, 54, 56, 58 from the waste material in the hopper 44. When in the retracted position, the pneumatic cylinders 52, 54, 56, 58 apply sufficient resistive force on the lower doors 40 such that the lower doors 40 will remain in the closed position and maintain an adequate seal with the lower surface 78a of the drum cover 78 when waste material is in the hopper 44. This will assure the lower doors 40 do not open prematurely under the weight of the waste material.

Drum cover 78, as best shown in FIGS. 1 and 2b, is a conventional cylindrical shaped structure having a central passage 78b therethrough which forms a conduit for the flow of material into disposal drum 32 which may be fabricated from sheet metal or other suitable material. The circumferential rim 78c of the drum cover 78 is configured to form a sufficient seal with the rim (not shown) of the disposal drum 32 to minimize odor escaping from the disposal drum 32 into environment either during operation or when idle.

Figure 3:
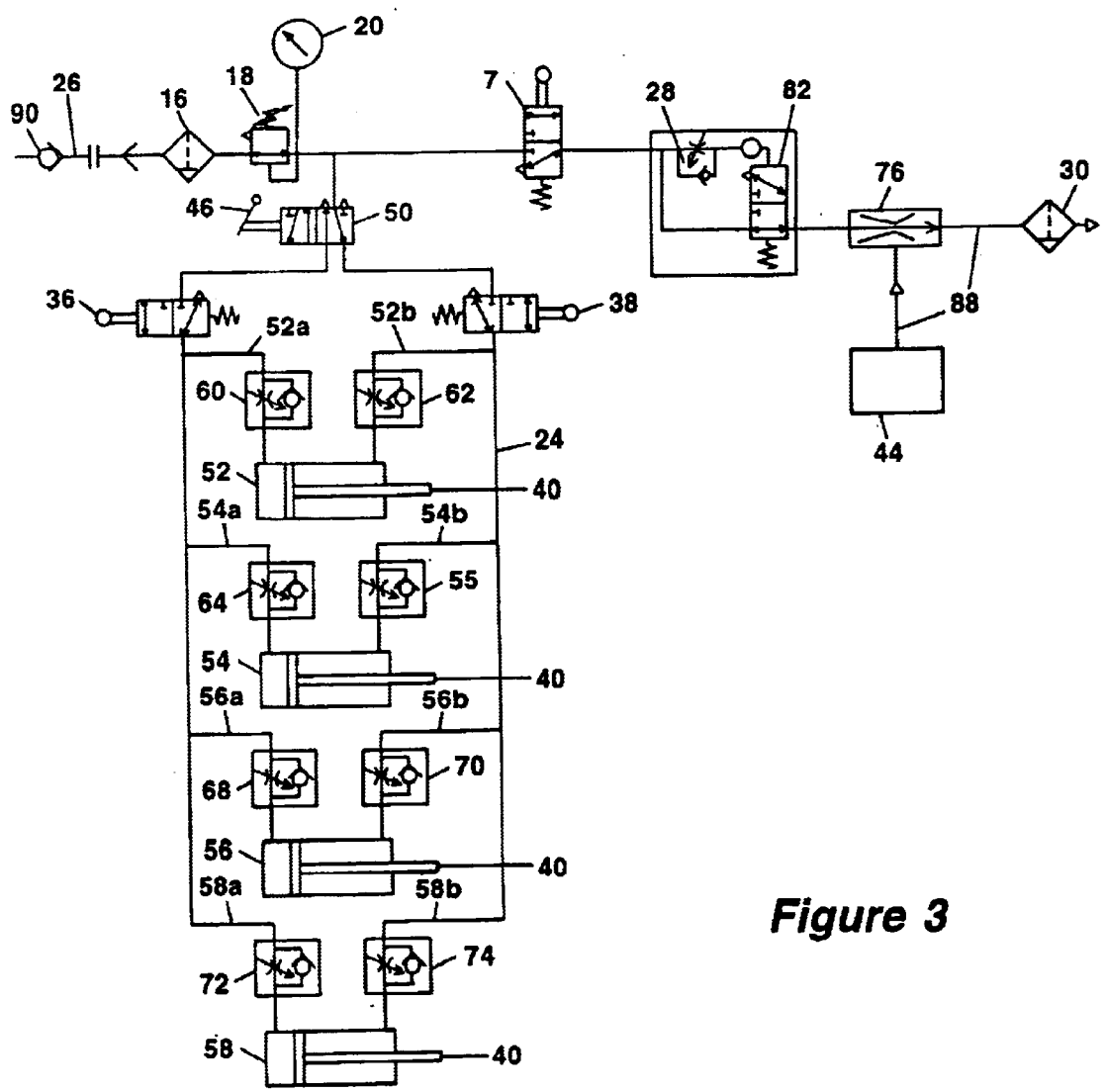
FIG. 3 is a schematic of the pneumatic system of the FIG. 1 embodiment.

Material disposal system 10 is preferably operated by a pneumatic control system that can perform multiple functions as illustrated in the schematic diagram shown in FIG. 3. The first function of the pneumatic control system is the opening and closing of the lower doors 40 to release waste material deposited in the hopper 44 into the disposal drum 32. Supply air 90 provides compressed air, at least 50 PSI, to a five-way/two-position valve 50 that controls the opening and closing of the lower door 40. When toggle switch 46 is positioned to lower the lower doors 40 to the open position, as shown in FIG. 2b, valve 50 is opened and compressed air is supplied directly to a three-way/two position valve 36 and to the restricted flow sides of flow controls 60, 64, 68, which restricts the air flow to a pneumatic cylinders 52, 54, 56, 58. Valve 50 provides simultaneous and equal air pressure to upper air lines 52a, 54a, 56a, 58a which supply air to the top of each air cylinder 52, 54, 56, 58. When toggle switch 46 is positioned to raise the lower doors 40 to the closed position, compressed air is supplied directly to a three-way, two position valve 38 and to the restricted flow sides of flow controls 62, 66, 60, which restricts the air flow to a pneumatic cylinders 52, 54, 56, 58. Valve 50 provides simultaneous and equal air pressure to lower air lines 52b, 54b, 56b, 58b which supply air to the bottom of each air cylinder 52, 54, 56, 58 to exhaust the air from the bottoms of cylinders.

The second function of the pneumatic control system is to supply air to the venturi vacuum pump 76 to evacuate the hopper 44. Exhaust tubing 88 links the hopper 44, the venturi vacuum pump 76, and the filter 30. After the lower doors 40 are in the closed position, as shown in FIG. 2a, a plunger valve 7, shown in FIG. 2b attached to the lower surface 78a of the drum cover 78 and activated by the closing of the lower doors 40, will redirect the supply air 90 to a programmable delay/timer 28. The delay/timer 28 is battery operated and controls the compressed air that flows from the supply air 90 through the venturi vacuum pump 76. After a desired period of delay as determined by a delay/timer 28, a valve 82 opens to flow air through the venturi vacuum pump 76. The air in the hopper 44 is drawn out and through the filter 30, for example a 3 microns charcoal filter element or other suitable porous material, for purification before being released into the environment. After a predetermined time period (preferably 20 seconds), delay/timer 28 closes the valve 82 and the process is ready to begin again.

To assure clean and dry air is supplied, supply air 90 flows through, for example, a 0.3-micron particulate filter 16 upon entering at the compressor supply air hook up 22. A regulator 18 and a 100-PSI gauge 20 control the supply air intake. Supply air 90 can be supplied to the system 10 by attaching tubing 24, having commercially available couplers specified by the customer, to the compressor air facility hook up 22 at one end and the supply air hook up (not shown) at the other end. An example of the tubing 24 is 25 ft of ¼"

polyurethane 95 durometer with quick couplings 25 for easy connect to/disconnect from the facility compressed air.

Although the invention has been described as utilizing pneumatic cylinders as an actuating means, any other suitable means may be used, such as hydraulic systems, electric servos and solenoids, a manual controlled lever or other means utilizing mechanical advantages.

MODE OF OPERATION

As stated above, the lower doors 40 are pneumatically driven having a series of 3-way valves 36,38,50, flow control valves 60, 62, 64, 68, 70, 72, 74, and double acting cylinders 52, 54, 56, 58, coupled by tubes 24 to open and close the lower doors 40. The double acting cylinders 52, 54, 56, 58, are pivotally connected to the lower doors 40 and the casing 12. When the lid 14 is open, two normally closed 3-way manual valves 36, 38, are deactivated blocking the flow of supply air 90 to prevent the lower doors 40 from opening to the disposal drum 32 and exposing the fumes and odors to the outside environment. Once the lid 14 is closed, the two valves 36, 38, in the lid 14 are actuated simultaneously allowing supply air 90 to flow to the pneumatic cylinders 52,54, 56, 58. Once the waste material is place in the hopper 44 and the lid 14 is closed, the operator advances the toggle lever 46 that opens the 3-way valve 50. The supply air 90 advances through flow control valves 60, 64, 68, 72 to the double acting cylinders 52, 54, 56, 58, which extend and open the lower doors 40 allowing the waste material to drop into the disposal drum 32. Next the operator releases the toggle lever 46 causing the supply air 90 to reverse through the flow control valves 62, 66, 70, 74, thereby retracting the double acting cylinders 52, 54, 56, 58, and closing the lower doors 40.

Additional, upon the release of the toggle lever 46 and actuation of the plunger valve 7, the venturi vacuum pump 76 generates a suction and contaminated air in the hopper 44 evacuates through the venturi vacuum pump 76 to the charcoal absorbent exhaust filter 30, preferably a 0.3 micro particle filter. As stated above, a delay/timer 28 and a valve 82 control the start and duration of the airflow from the supply air 90 to the filter 30.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A noxious gas filtering system for use with a disposal container comprising:
    a cover member adapted to be lowered into a position on top of an opening of the disposal container, said cover member being adapted to provide a substantially airtight seal between said cover member and the disposal container, said cover member having a passage therethrough, said cover member further having a upper end and a lower end;
    at least one lid pivotally attached to said upper end of said cover member to provide a substantially airtight seal between said at least one lid and said upper end of said cover member, said at least one lid extends outwardly from said cover member with sufficient extension to provide adequate clearance for inserting waste material into said cover member; and
    at least one door pivotally attached to said lower end of said cover member to provide a substantially airtight seal between said at least one door and said lower end of said cover member, said at least one door down extends outwardly from said cover member with sufficient extension to provide adequate clearance for dropping waste material into the disposal container, said at least one door being somewhat smaller than the opening of the disposal container.

2. The system according to claim 1 further comprising actuating means for raising and lowering said at least one door.

3. The system according to claim 2 wherein said actuating means include a plurality of pneumatic cylinders for raising and lowering said at least one door.

4. The system according to claim 2 further comprising a material handling insert disposed within said passage of said cover member such that said actuating means is protected from damage from waste material flowing through said passage of said cover member, said material handling insert having a channel therethrough for waste material to pass through.

5. The system according to claim 4 further comprising odor purging means for removing odor particles which may be contained in said material handling insert, said odor purging means connected to said material handling insert.

6. The system according to claim 5 wherein said odor purging means comprises a filter.

7. The system according to claim 6 wherein said odor purging means further includes exhaust means for evacuating odors from said material handling insert to said filter.

8. The system according to claim 6 wherein said filter comprises a charcoal filter or other suitable porous material adapted for the passage of air therethrough but adapted to preclude the passage of certain size particulate matter therethrough.

9. The system according to claim 7 wherein said exhaust means includes a vacuum pump having an inlet, an outlet, and a vacuum port, wherein said inlet is communicates with a compressed air supply, wherein said outlet is communicates with said filter, wherein said vacuum port is communicates with an outlet port of said material handling insert, whereby any noxious fumes or other unwanted gaseous materials contained within said material handling insert are drawn out and vented through said filter when the compressed air supply provides air to said inlet.

10. The system claim 1 wherein said cover member includes a circumferential rim extending radially outwardly adapted for engaging the top of the disposal container when said cover member is positioned on top of the opening of the disposal container thereof such that said cover member may be supported by the disposal container when so engaged to form a sufficient seal the disposal container to minimize odor escaping from the disposal container into environment either during operation or when idle.

11. A noxious gas filtering system for use with a disposal container comprising:
    a cover member adapted to be lowered into a position on top of an opening of the disposal container, said cover member being adapted to provide a substantially airtight seal between said cover member and the disposal container, said cover member having a passage therethrough, said cover member further having a upper end and a lower end;
    at least one lid pivotally attached to said upper end of said cover member to provide a substantially airtight seal between said at least one lid and said upper end of said cover member, said at least one lid extends outwardly from said cover member with sufficient extension to provide adequate clearance for inserting waste material into said cover member;

at least one door pivotally attached to said lower end of said cover member to provide a substantially airtight seal between said at least one door and said lower end of said cover member, said at least one door down extends outwardly from said cover member with sufficient extension to provide adequate clearance for dropping waste material into the disposal container, said at least one door being somewhat smaller than the opening of the disposal container;

actuating means for raising and lowering said at least one door;

a material handling insert disposed within said passage of said cover member such that said actuating means is protected from damage from waste material flowing through said passage of said cover member, said material handling insert having a channel therethrough for waste material to pass through; and odor purging means for removing odor particles which may be contained in said material handling insert, said odor purging means connected to said material handling insert.

12. The system according to claim 11 wherein said actuating means include a plurality of pneumatic cylinders for raising and lowering said at least one door.

13. The system according to claim 11 wherein said odor purging means comprises a filter.

14. The system according to claim 13 wherein said odor purging means further includes exhaust means for evacuating odors from said material handling insert to said filter.

15. The system according to claim 13 wherein said filter comprises a charcoal filter or other suitable porous material adapted for the passage of air therethrough but adapted to preclude the passage of certain size particulate matter therethrough.

16. The system according to claim 14 wherein said exhaust means includes a vacuum pump having an inlet, an outlet, and a vacuum port, wherein said inlet is communicates with a compressed air supply, wherein said outlet is communicates with said filter, wherein said vacuum port is communicates with an outlet port of said material handling insert, whereby any noxious fumes or other unwanted gaseous materials contained within said material handling insert are drawn out and vented through said filter when the compressed air supply provides air to said inlet.

17. The system claim 11 wherein said cover member includes a circumferential rim extending radially outwardly adapted for engaging the top of the disposal container when said cover member is positioned on top of the opening of the disposal container thereof such that said cover member may be supported by the disposal container when so engaged to form a sufficient seal the disposal container to minimize odor escaping from the disposal container into environment either during operation or when idle.

* * * * *